United States Patent [19]

Rother

[11] Patent Number: 5,909,479
[45] Date of Patent: Jun. 1, 1999

[54] VACUUM HOUSING FOR AN ELECTRON TUBE

[75] Inventor: Peter Rother, Baiersdorf, Germany

[73] Assignee: Siemens Akiengesellschaft, Munich, Germany

[21] Appl. No.: 08/967,884

[22] Filed: Nov. 12, 1997

[30] Foreign Application Priority Data

Nov. 20, 1996 [DE] Germany .......................... 196 48 051

[51] Int. Cl.⁶ .................................................. H01J 35/30
[52] U.S. Cl. ........................................... 378/121; 378/119
[58] Field of Search .................................. 378/119, 121, 378/123, 136; 313/317, 318.01, 318.02, 318.08, 318.12, 477 R, 488

[56] References Cited

U.S. PATENT DOCUMENTS

| | | | |
|---|---|---|---|
| 4,713,520 | 12/1987 | Nice et al. ......................... | 219/121.63 |
| 5,032,756 | 7/1991 | Takenaka et al. ........................ | 313/2.1 |
| 5,822,395 | 10/1998 | Schardt et al. ........................... | 378/137 |
| 5,828,727 | 10/1998 | Schild ..................................... | 378/140 |
| 5,838,761 | 11/1998 | Behner et al. ........................... | 378/123 |

FOREIGN PATENT DOCUMENTS 0 460 421   5/1991   European Pat. Off. .

OTHER PUBLICATIONS

"Konstrukteure müssen umdenken," Kappelsberger, Industrie–Anzeiger vol. 43, No. 44, (1989) pp. 36–38.
Höheres Leistungsniveau erreichen, von Trotha et al., Industrie–Anzeiger 44, (1991) pp. 16–18.

Primary Examiner—David P. Porta
Attorney, Agent, or Firm—Hill & Simpson

[57] ABSTRACT

A vacuum housing is provided for an electron tube having an anode and a cathode, the vacuum housing having a region containing a volume for the acceptance of the anode that is connected to a chamber for the acceptance of the cathode via a shaft-shaped housing section made of weldable material. A first part of the shaft-shaped housing section is integrally formed with a portion of housing which contains the volume for the acceptance of the anode. A second part of the shaft-shaped housing section is integrally formed with the chamber for the acceptance of the cathode. A laser weld connects the first and second parts of the shaft-shaped housing section together vacuum-tight.

2 Claims, 2 Drawing Sheets

VACUUM HOUSING FOR AN ELECTRON TUBE

BACKGROUND OF THE INVENTION

1. Field of the Invention

The present invention is directed to a vacuum housing for an electron tube having comprising an anode and a cathode, the vacuum housing being of the type having a volume containing a space for the acceptance of the anode that is connected via a shaft-shaped housing section to a chamber for the acceptance of the cathode, with the chamber and the volume for the acceptance of the anode being connected to one another via a weld.

2. Description of the Prior Art

In an X-ray tube with such a vacuum housing, it is possible to arrange means for the deflection of the electron beam, which propagates through the shaft-shaped housing section during the operation of the X-ray tube, in the region of the shaft-shaped housing section, and, thus close to the electron beam to be deflected.

The capability of deflecting of the electron beam and thus also deflecting the focal spot, is especially important in the context of computed tomography since this allows an improvement of the image quality by the known measure known of displacing the focal spot between two limit positions, thereby doubling the data available for the computation of the image of a body slice.

When, during the operation of the X-ray tube of the type initially described, the vacuum housing the X-ray tube lies at a more positive potential than the cathode which is for example, at ground potential, a large portion of the electrons scattered back from the anode (secondary electron bombardment) is captured by the shaft-shaped housing section and at the adjacent regions of the vacuum housing. Apart from its purpose as a housing, the vacuum housing therefore also performs the function of a diaphragm that serves to decrease the extra-focal radiation, especially in the region of the shaft-shaped housing section.

An X-ray tube with a vacuum housing of the type initially described is disclosed in European Application 0 460 421. The shaft-shaped housing section in this vacuum housing is bonded by a weld to an approximately planar wall of the volume of the vacuum housing containing the space for the acceptance of the anode. This weld is conventionally made by TIG-welding and does not always resist the thermomechanical stress to which it is exposed as a result of the aforementioned secondary electron bombardment. Total failures of X-ray tubes therefore frequently occur as a result of inadequate vacuum tightness of the vacuum housing.

SUMMARY OF THE INVENTION

An object of the present invention is to provide a vacuum housing of the type initially described wherein the danger of leakages is reduced in the region of the weld connecting the chamber and the volume provided for the acceptance of the anode.

This object is achieved according to the invention in a vacuum housing for an electron tube having an anode and a cathode, the vacuum housing having a volume for the acceptance of the anode that is connected via a shaft-shaped housing section formed of weldable material to a chamber for the acceptance of the cathode, wherein a first part of the shaft-shaped housing section is integrally formed with the chamber and a second part of the shaft-shaped housing section is integrally formed with the portion of the vacuum housing surrounding the space for the acceptance of the anode, and a laser weld that connects the two parts of the shaft-shaped housing section to one another vacuum-tight is provided for the connection of the chamber and the space provided for the acceptance of the anode.

In the vacuum housing of the invention, the weld is therefore located in the region of the shaft-shaped housing section that is subdivided into two parts. This measure in conjunction with the fact that the weld is executed as a laser weld leads to more advantageous stress conditions, with the result that practically no leakages of the vacuum housing occur in the region of the weld.

According to a preferred embodiment of the invention, the material of the shaft-shaped housing section is penetration-welded. In contrast to known vacuum housings of the type described earlier, wherein a penetration welding was practically not possible as a consequence of the arrangement of the weld at the transition between the shaft-shaped housing section and the wall of the region of the vacuum housing limiting the space provided for the acceptance of the anode, significantly more advantageous stress conditions result in the inventive structure. In the case of a non-penetration-welded weld, a more or less deep notch remains that functions like an intentionally-produced frangible line, and simultaneously represents a hindrance to the temperature compensation between the chamber of the vacuum housing accepting the cathode and the region of the vacuum housing surrounding the anode. By contrast, a flush, non-positive transition without dangerous break points between the two parts of the shaft-like housing component is established by a penetration-welded laser weld located in the region of the shaft-like housing section. Moreover, such a weld promotes temperature compensation (equalization) between the chamber accepting the cathode and the region of the vacuum housing that accepts the anode.

DESCRIPTION OF THE PREFERRED EMBODIMENTS

Figure 1:
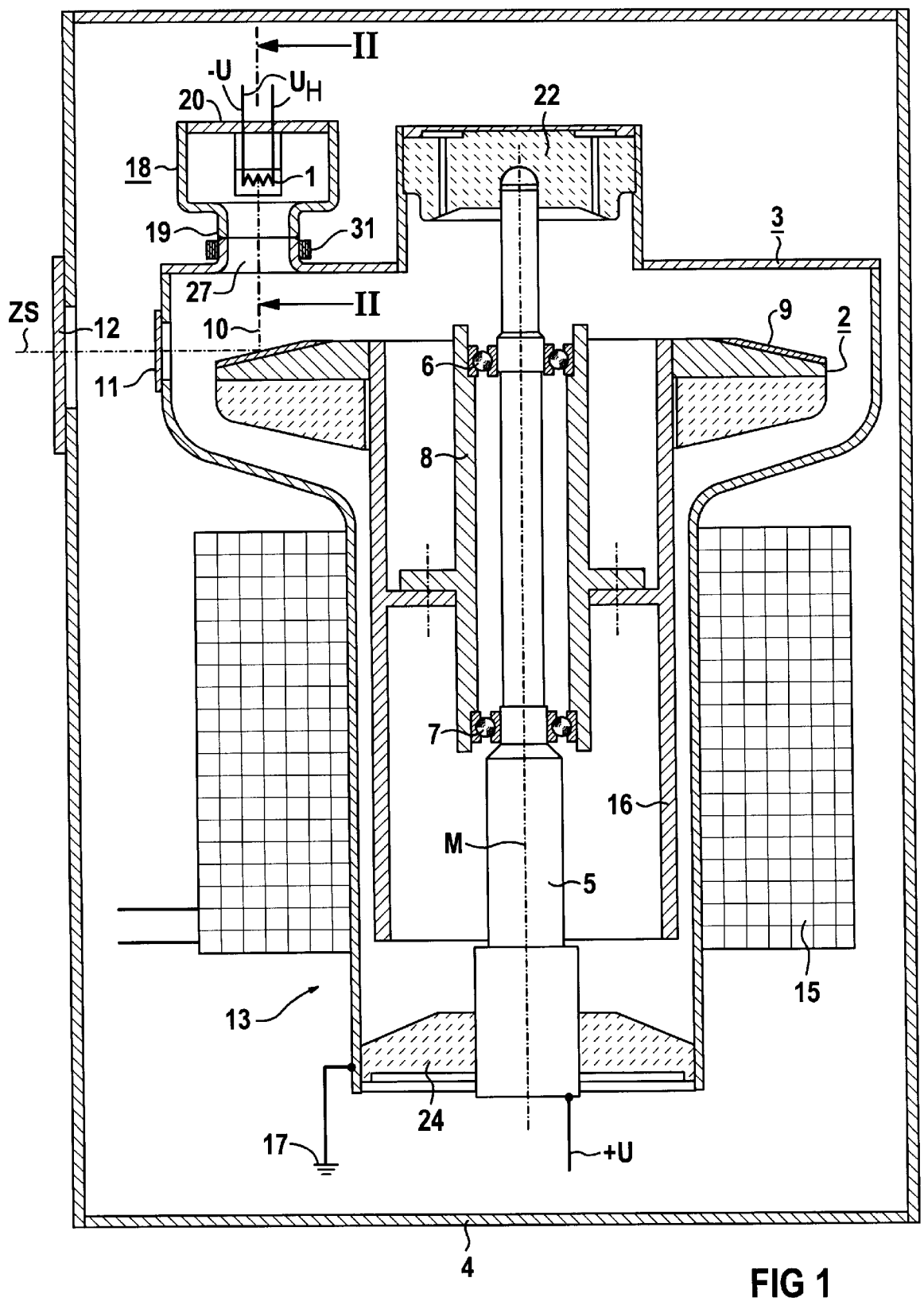
FIG. 1 shows an X-ray tube with a vacuum housing of the invention in longitudinal section.

The X-ray tube according to FIG. 1 has a fixed cathode 1 and a rotating anode, generally referenced 2, that are arranged in a vacuum-tight, evacuated housing 3 that is in turn accepted in a protective housing filled with an electrically insulating, liquid cooling agent, for example insulating oil. The rotating anode 2 is rotatably seated on a fixed shaft 5 in the vacuum housing 3 via two roller bearings 6 and 7 and a bearing sleeve 8.

The rotating anode 2, that is fashioned rotation-symmetrically relative to the center axis M of the shaft 5, has an impact region that is provided with a layer of a tungsten-rhenium alloy, for example, which is struck by an electron beam 10 originating from the cathode 1 for the generation of X-radiation. (Only the center axis of the electron beam 10 is shown in FIG. 1 as a broken line.) The corresponding useful ray beam, of which only the central ray Z is shown in FIG. 1, exits through the beam exit windows 11 and 12 that are provided in the vacuum housing 3 and in the protective housing 4 and which are arranged in alignment with one another.

An electric motor, fashioned as squirrel-cage motor generally referenced 13, is provided for the drive of the rotating anode 2, which has a stator 15 that is slipped onto the vacuum housing 3 and a rotor 16 located inside the vacuum housing 3 that is connected to the rotating anode 2 in a rotationally fixed manner inside the vacuum housing 3.

The vacuum housing 3 is made of metallic material except for an insulator 20 that supports the cathode 1 and two insulators 22 and 24 and is at ground potential 17. The vacuum housing 3 has a region surrounding a space or volume 25 provided for the acceptance of the rotating anode 2 to which a chamber 18 provided for the acceptance of the cathode 1 is connected via a shaft-shaped housing section 19. The cathode 1 is attached in the chamber 18 via the insulator 20. The cathode 1 is therefore located in a special chamber of the vacuum housing 3 that is connected to it via the shaftshaped housing section 19.

The shaft 5 is at a positive high voltage +U for the rotating anode 2 that is accepted vacuum-tight in the insulator 22. The tube current therefore flows via the roller bearings 6 and 7.

One terminal of the cathode 1 is at a negative high voltage −U as shown in the schematic drawing of FIG. 1. The filament voltage $U_H$ lies between the two terminals of the cathode 1. The lines leading to the cathode 1, the shaft 5, the vacuum housing 3, and the stator 15 are in communication with a voltage supply (not shown) of a known type situated outside the protective housing 4 that supplies the necessary voltages for the operation of the X-ray tube. The X-ray tube according to FIG. 1 is thus of a type known as a two-pole X-ray tube.

It can be seen from FIG. 1 that the electron beam 10 that originates from the cathode 1 propagates through the shaft-shaped housing section 19 on its way to the rotating anode 2. The shaft-shaped housing section 19 therefore limits a diaphragm aperture 27. The dimensions thereof are selected such that they do not significantly exceed the dimensions which are necessary for an unimpeded passage of the electron beam 10.

At least the chamber 18, the shaft-shaped housing section 19, and the upper wall of the vacuum housing 3 in FIG. 1 (and preferably all parts of the vacuum housing 3) are made of non-magnetic materials, for example stainless steel, and limit an annular space that is radially open to the exterior of the vacuum housing 3. An electromagnet 31, which is schematically indicated in FIG. 1, is arranged in this annular space and serves to generate a magnetic deflecting field for the electron beam 10, that deflects the electron beam 10 perpendicularly to the plane of the drawing of FIG. 1.

The winding 32 of the electromagnet 31 forms a U-shaped yoke and has schematically indicated terminals in communication with a current source that allows a current to flow through the winding 32 during the operation of the X-ray tube. The intensity of current and the timing thereof are selected so that a desired deflection behavior of the electron beam 10 results.

Figure 2:
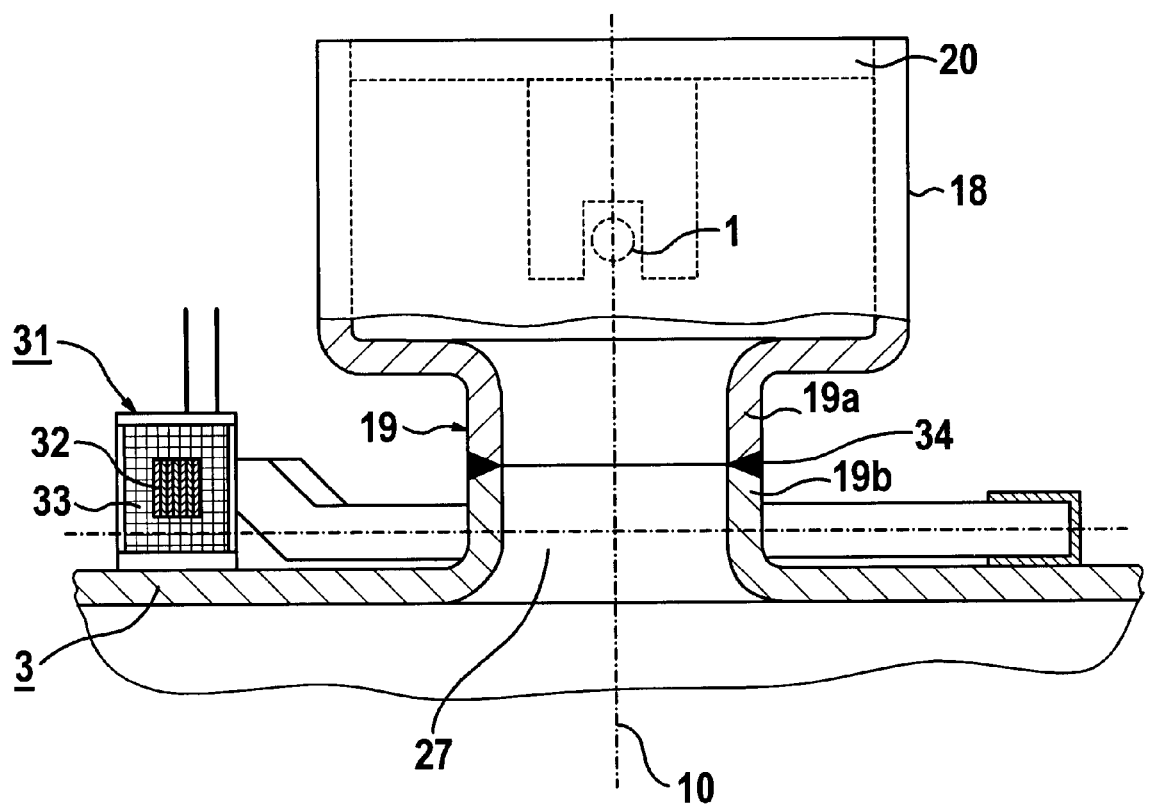
FIG. 2 shows a sectional view of a portion of the X-ray tube of FIG. 1 taken along the line II—II in FIG. 1.

As can be seen from the FIGS. 1 and 2, the shaft-shaped housing section 19 is not constructed as a separate component, but instead one part 19a is integrally formed with the chamber 18 and one part 19b is integrally formed with the region of the vacuum housing 3 limiting the space 25 provided for the acceptance of the anode.

A laser weld 34 is provided for the connection of the chamber 18, and the part 19a of the shaft-shaped housing section 19 integrally applied thereto, to the remaining vacuum housing 3 surrounding the space 25 accepting the rotating anode 2 and the part 19b of the shaft-shaped housing section 19 integrally applied thereto. The material of the shaft-shaped housing section 19 is penetration-welded by the laser weld 34 as can especially be seen from FIG. 2. This means that the two parts 19a and 19b of the shaft-shaped housing section 19 are connected to one another in the region of the laser weld 34 over its entire cross section with a non-positive lock, without a gap remaining.

The danger of leakages of the vacuum housing occurring in the region of the weld is reduced by the structure as well as by the placement of the weld.

As noted above, the X-ray tube shown in FIG. 1 is a two-pole X-ray tube. The X-ray tube of the invention, however, can also be fashioned as a single-pole X-ray tube. The vacuum housing 3 and the rotating anode 2 then carry the same potential, namely ground potential 17, whereas the negative high voltage −U lies at the cathode 1. An end shield made of an electrically conductive material can be provided instead of the insulator 22 and/or the insulator 24, so that an electrically conductive connection exists between the rotating anode 2 and the vacuum housing 3. The shaft 5 can alternatively or additionally be connected to the ground potential 17.

Although the invention has been described herein in the context to an X-ray tube with a rotating anode, it can also be utilized in X-ray tubes with a fixed anode.

Moreover, the explanation of the inventive electron tube housing in the context of an X-ray tube is only exemplary since the invention can be utilized in any type of electron tube.

Although modifications and changes may be suggested by those skilled in the art, it is the intention of the inventor to embody within the patent warranted hereon all changes and modifications as reasonably and properly come within the scope of his contribution to the art.

I claim as my invention:

1. In an electron tube having a vacuum housing containing an anode and a cathode, which emits an electron beam, said vacuum housing having a chamber containing said cathode and a volume containing said anode, with a shaft-shaped housing section, through which said electron beam proceeds from said cathode to said anode, connecting said chamber to said volume, the improvement of said vacuum housing comprising:

said shaft-shaped housing section having a first portion integrally formed with said chamber;

said shaft-shaped housing having a second portion integrally formed with a region of said vacuum housing containing said anode; and a laser weld connecting said first and second portions of said shaft-shaped housing section vacuum-tight.

2. The improvement of claim 1 wherein each of said first and second portions of shaft-shaped housing section is comprised of material, and wherein said laser weld comprises a weld in which said material of said first and second portions of said shaft-shaped housing section are penetration-welded.

* * * * *